Sept. 6, 1966  K. JUERGENSEN  3,271,649
REGENERATIVE BRAKING SYSTEM
Filed Sept. 6, 1963  2 Sheets-Sheet 1

INVENTOR.
KLAUS JUERGENSEN
BY
ATTORNEYS

Sept. 6, 1966    K. JUERGENSEN    3,271,649
REGENERATIVE BRAKING SYSTEM
Filed Sept. 6, 1963
2 Sheets-Sheet 2

INVENTOR.
KLAUS JUERGENSEN
BY
ATTORNEYS

United States Patent Office 3,271,649
Patented Sept. 6, 1966

3,271,649
REGENERATIVE BRAKING SYSTEM
Klaus Juergensen, Huntsville, Ala., assignor to the United States of America as represented by the Administrator of the National Aeronautics and Space Administration
Filed Sept. 6, 1963, Ser. No. 307,270
15 Claims. (Cl. 318—376)

The invention described herein may be manufactured and used by or for the Government of the United States of America for governmental purposes without the payment of any royalties thereon or therefor.

This invention relates to direct current electromotive systems and more particularly to a system providing a simple and efficient means for the regenerative braking of an electromechanical transducer.

There are many applications where electromechanical transducers or electrical motors are required to do work on a part-time basis and wherein there are periods when instead of there existing a necessity for driving power from the motor, the opposite effect, braking power, is required. In such applications it has long been recognized that braking can be achieved by operating the motor in a generating mode and thereby creating a load on the motor proportional to the generated electric power. In such cases, the consumption of this power may either be wasteful or useful and in many instances the former approach is employed as either the most convenient or the most feasible with known technology. Heretofore, efforts to put the braking energy to work have usually required special motor designs and speed requirements which have tended to offset advantages from increased efficiency. For example, field coils must be adapted to provide increased flux during the generating mode and pole pieces must be designed to handle increased flux necessitating a general overdesign. Further, useful operation for braking is only possible when speeds are maintained in the upper range of operation, thus limiting periods of braking. For these reasons it appears that regenerative braking, or dynamic braking, has generally been of the dissipative type wherein during braking, the motor is disconnected from the source and connected to electrical resistance wherein the braking energy is simply disposed of as heat.

It is an object of the present invention to overcome the aforesaid difficulties and provide an efficient and convenient system for regenerative braking.

In accordance with the invention a motor which is to be driven is interconnected with a rechargeable direct current (D.C.) power source through an inductive energy storage device or inductor. A pair of electronic oscillating switches are connected to alternately connect and disconnect such source from the motor. In addition, a pair of diodes provide a current path to transfer energy back into the D.C. power source during the time the oscillating switches are open. With this configuration, energy is readily transmitted from the source to the motor and the inductive energy storage device during the motoring mode of operation of said motor, and energy is transferred from the motor and inductive energy storage device to the source during the regenerative braking mode of operation of said motor. Polarity reversal may be accomplished by simply switching interconnecting conductors or be electronically achieved, as by means to be described.

Pulse duration modulation, conveniently obtainable by a magnetic amplifier or other known circuits, controls the duty cycle (on to off time) of the oscillating switches to precisely adjust the energy exchange in either direction between the source and motor. In this manner a very accurate control of both acceleration and deceleration of the motor can be obtained.

Other objects, features and advantages of this invention will be apparent from the following detailed description when considered together with the accompanying drawings in which.

Figure 1:
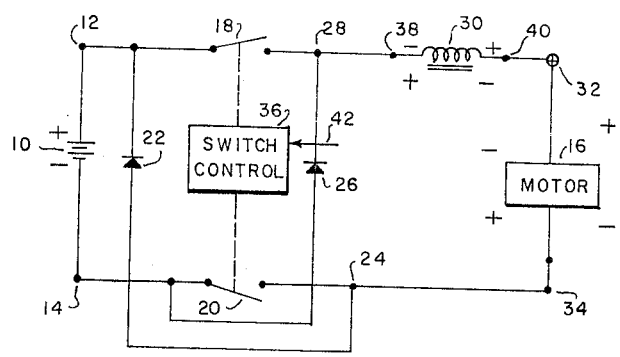
FIGURE 1 illustrates broadly a schematic diagram of an embodiment of the invention.

Referring now to FIG. 1, source 10, having plus terminal 12 and minus terminal 14, energizes motor load 16 through first oscillating switch 18 and second oscillating switch 20. Diode 22 is connected between source terminal 12 and terminal 24, on the output side of switch 20, diode 22 being poled to pass current from terminal 24 to terminal 12. Diode 26 is connected and poled to allowed current flow from source terminal 14 to terminal 28, on the output side of switch 18. Inductor 30, comprising an inductive energy storage device, is connected in the source positive conductor between terminal 28 and positive terminal 32 of motor load 16, this polarity sign referring to the motor load when operating in its motoring mode (right hand polarity symbols). If the terminals of motor load 16 are reversed then the positive terminal will be terminal 34 and the minus terminal 32 (left hand polarity symbols), assuming the same direction of rotation of motor load 16. Switches 18 and 20, which may conveniently be electronic switches such as transistor switches, are controlled in unison by switch control means 36. A magnetic amplifier, being readily controlled as to duration of its "on" and "off" modes of operation, is an excellent such switch control.

Assume initially that switches 18 and 20 are open and switch control 36 in it second control mode allows them to remain in this condition for an initial period. It will be observed that no current can flow from source 10 to motor load 16 as neither switches 18 and 20 nor diodes 22 and 26 provide a closed circuit. Assume next that switch control 36 is phased to its first control mode causing switches 18 and 20 to close. Now, current will flow from source 10 through terminal 12, switch 18, inductor 30, motor load 16, and switch 20 back to negative terminal 14 of source 10. This will not only energize motor load 16 and place it in a motoring mode of operation but will charge inductor 30. During this period of charge, terminal 38 of inductor 30 will be positive with respect to terminal 40 (lower polarity markings). The voltage across the inductor will be the difference between the power source voltage and load voltage.

As soon as switches 18 and 20 open, inductor 30 changes its polarity (upper polarity markings) and feeds its previously stored energy back into the circuit. If the circuit is now traced, inductor 30 becomes a source which continues to supply current through motor load 16 by virtue of the path through diode 22, source 10 (in a charging direction), and diode 26 back to inductor 30. Thus inductor 30 alternatively absorbs energy (while switches 18 and 20 are closed) and discharges energy (while switches 18 and 20 are open). At any instant, inductor 30 provides sufficient voltage to satisfy voltage equilibrium. In the driving mode of motor load 16 energy is flowing into and out of power source 10, however, the average power flow is out of power source 10 and into motor load 16.

If braking action is desired, motor load voltage 16 must be made to change polarity. This can, for example, be achieved by interchanging the leads to motor load 16 or by changing the direction of torque of motor 16, as by an electronic commutation, an illustration of which is set forth in Farrelly Patent 3,018,449. In the regenerative braking mode, the circuit works in exactly the same fashion except that average power flow is from motor load 16 to power source 10. In this instance the sign of the motor load voltage is as indicated on the left side of motor load 16 (negative at the top and positive at the bottom terminal). The initial potential applied to inductor 30, with switches 18 and 20 closed, is of the polarity indicated below terminals 38 and 40 (plus at the left terminal and minus at the right terminal).

When switches 18 and 20 are opened, to place inductor 30 in a discharge mode, its potential, being as above its terminals, is added to that of motor load 16 and thus there is provided, as a charging effect, current to source 10. The mechanical reaction is, of course, a braking of motor 16. The current path during braking is from inductor 30 through motor load 16, diode 22, source 10, and diode 26 back to inductor 30. Switch control 36 is controlled through input 42.

The maximum efficiency of transfer of energy between source 10 and load 16 is achieved when switches 18 and 20 are closed for a period of slightly less than their open time.

Figure 2:
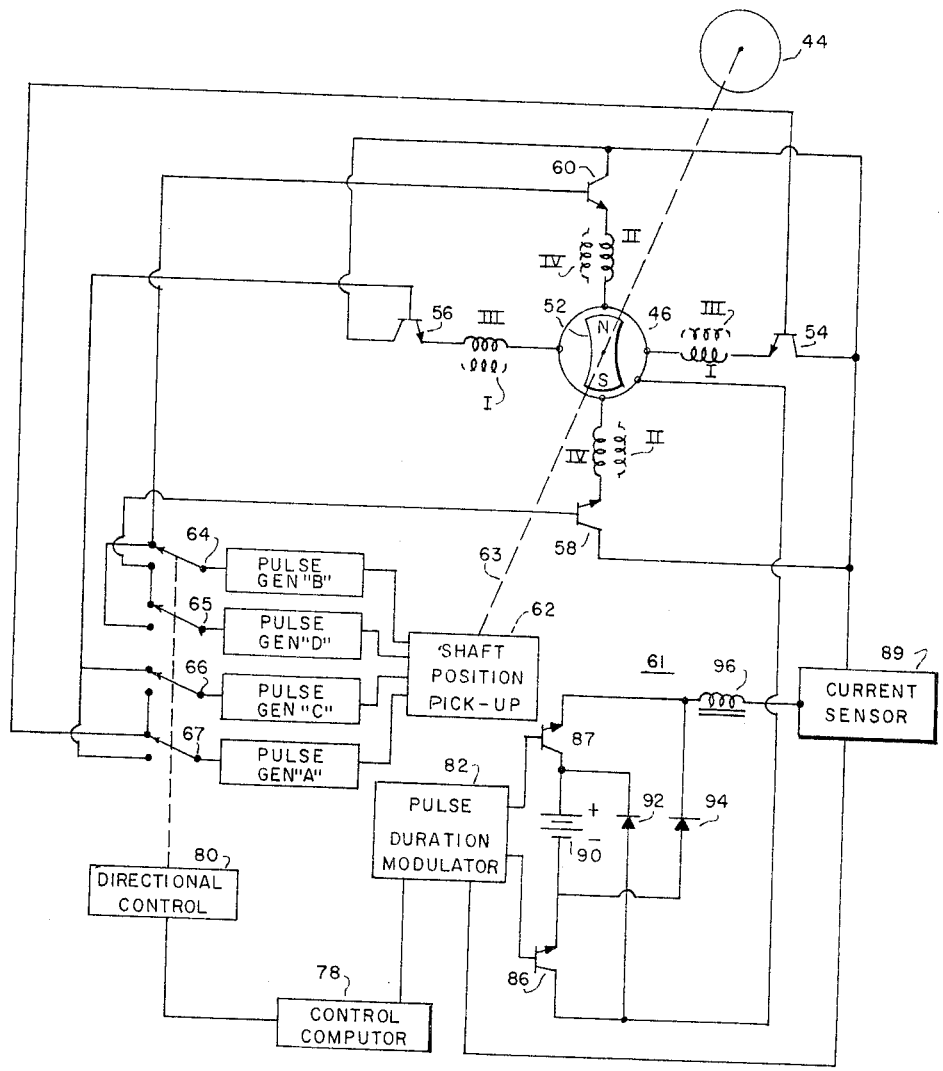
FIGURES 2 and 3 illustrate schematically an embodiment of the invention particularly adapted for the control of the attitude of a space vehicle.
Figure 3:
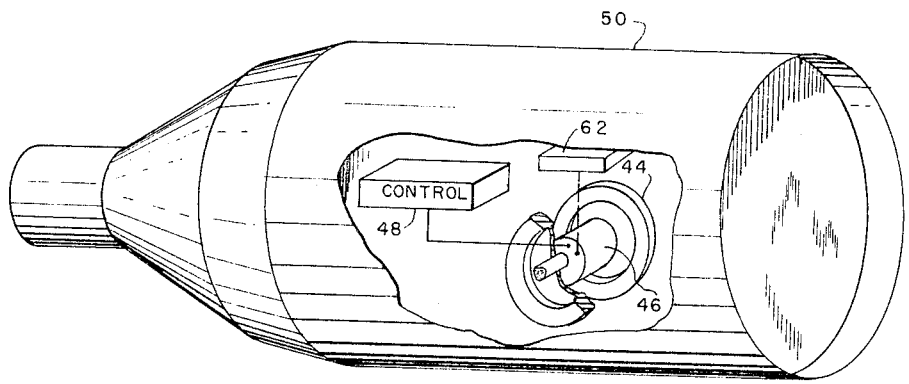

FIGS. 2 and 3 are schematically illustrative of an embodiment of the invention as employed in a space vehicle as an attitude control system. FIG. 3 broadly illustrates this usage depicting a control in the pitch plane by means of acceleration and deceleration of momentum wheel 44. Attitude control in the other attitudes, roll and yaw would be similarly provided. Motor 46 which drives momentum wheel 44 is powered and controlled by control circuitry 48 shown in detail in FIG. 2. It will be observed that with motor 46 mounted to the body of space vehicle 50 that acceleration of momentum wheel 44 in a clockwise direction will produce a reaction on vehicle 50 which will cause it to pitch downward. Similarly, if a decelerating force is subsequently applied, an opposite effect tending to cancel or reverse the pitch movement will occur.

Motor 46 is shown schematically in FIG. 2 and is of the type having a rotating permanent magnetic armature or rotor 52 and stationary coils I, II, III, IV. In practice coils I and III are wound in the same iron stator slots as are coils II and IV.

Figure 4:
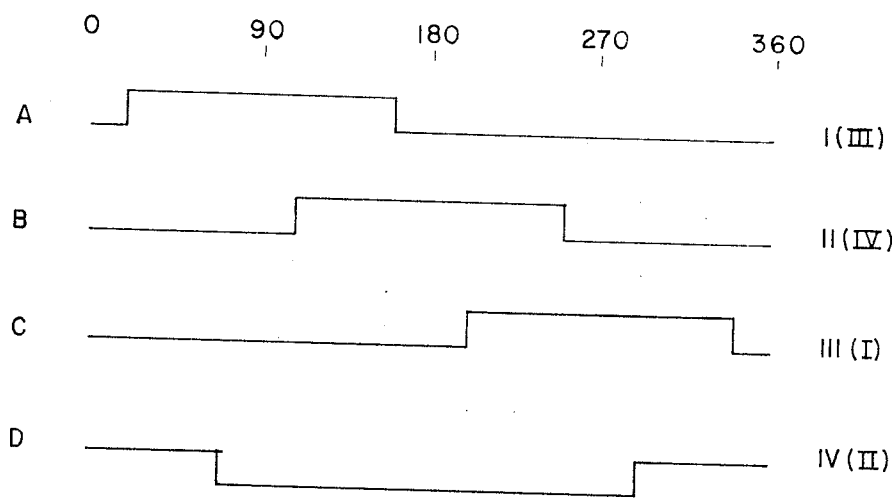
FIGURE 4 shows a series of wave forms illustrative of the operation of circuitry shown schematically in FIGURE 2.

Electronic commutation is employed to achieve a rotating field with these coils. Desired sequences of commutation for clockwise and counterclockwise commutation of motor 46 are selectively achieved by control of transistor switches 54, 56, 58 and 60 through which coils I–IV are powered. With switches 64–67 (illustrated as mechanical switches but may be electronic) in their indicated positions a counterclockwise rotating field is produced. The pattern of this field is illustrated in FIG. 4 opposite the numerical designations (not bracketed) of coils I–IV. This pattern, a series of pulse trains, is generated by pulse generators A–D, shown with like lettered designations for the pulse trains. Current pulses to coils I–IV are provided from power supply 61 in accordance with the "on" position, positive portion, of pulse trains A–D which key on transistor switches 54, 56, 58 and 60. Pulse generators A–D are keyed on by shaft position pickup 62 through cam engagements, not shown, with shaft 63. FIG. 4 illustrates one revolution, 360 degrees, of shaft 63.

Clockwise operation is achieved with switches 64–67 in the lower position, with coils I–IV being energized in accordance with the pulse trains opposite the bracketed designation of these coils in FIG. 4.

Assume, for example, that it is desired to rotate momentum wheel 44 in a counterclockwise direction. Control computer 78 provides a means for selectively actuating the switch control for pulse duration modulator 82 and directional switch control 80. The output of computer 78 to directional switch control 80 is, for example, a D.C. voltage of a polarity directing an upper position for switches 64–67, their present position. The signal from computer 78 is also applied to pulse duration modulator 82. The "on" to "off" time of transistor switches 86 and 87 is proportional to the magnitude of this signal. For example, modulator 82 comprises a conventional magnetic amplifier wherein a pulse train output is provided which has a variable "on" to "off" time cycle to vary the magnitude of current flow through transistor switches 86 and 87 between motor 46 and source 90. This current flow is stabilized by negative feedback from current sensor 89 (which provides an output proportional to current flow) to modulator 82. In this manner the current flow is held substantially proportional to the signal input (from computer 78 to modulator 82). Thus the acceleration or deceleration of momentum wheel 44 is proportional to this signal. Diodes 92 and 94 and inductor 96 function as their counterparts in FIG. 1.

Assume now that computer 78 determines that momentum wheel 44 must be decelerated in order to apply an opposite attitude control effect to that initiated and described above. This is accomplished by applying an opposite sense control signal to switch control 80 to cause it to pull switches 64–67 to their lower position and by applying to pulse duration modulator 82 a signal corresponding to the degree of braking to be applied to motor 46 and momentum wheel 44. As described above, whenever transistor switches 86 and 87 are in an open condition, inductor 96 and motor 46 combine to supply current, and thus charging power, back through diodes 92 and 94 to source 90. The change in effective counter E.M.F. voltage, from a motoring condition to a regenerative braking condition, as stated above, as being necessary to accomplish this recharging action, occurs by virtue of the switch in drive sequence to coils I–IV as illustrated in FIG. 4 opposite the bracketed designations of these coils. Simply explained, this results from the fact that motor 46 is now commutated in a reverse direction and thus it produces a reverse torque and counter E.M.F. Thus not only is momentum wheel 44 braked by virtue of the reverse commutation of motor 46 to achieve attitude control, the braking energy is substantially stored, used to recharge source 90. It will be appreciated that in space applications, where conservation of electrical power is extremely important, the present invention provides significant means for conservation. Further, it avoids the necessity of otherwise dissipating the energy as heat, which is a substantial problem in view of the lack of environmental atmosphere in which to accomplish such dissipation. In space or on the ground this savings in energy provides marked increases in efficiency.

Obviously, many modifications and variations of the present invention are possible in the light of the above teachings. It is, therefore, to be understood that within the scope of the appended claims the invention may be practiced other than as specifically described.

I claim:
1. A direct current bilateral energy transfer system comprising:
 (A) a source of direct current having first and second terminals;
 (B) electromechanical means comprising first and second electrical terminals and a mechanically moving element and means for interchanging energy between said electrical terminals and moving element;
 (C) a first electrical circuit interconnecting said first terminal of said source and said first terminal of said electromechanical means and including in series first switching means and an inductor,
   (1) said first switching means comprising means for controllably opening and closing said first electrical circuit;
 (D) a second electrical circuit interconnecting said second terminal of said source and said second terminal of said electromechanical means and including in series second switching means,

(1) said second switching means comprising means for controllably opening and closing said second electrical circuit;

(E) a first unidirectional conducting circuit connected between said first terminal of said source and said second terminal of said electromechanical means and poled to permit current flow only from said last named second terminal to said last named first terminal;

(F) a second unidirectional conducting circuit connected between said second terminal of said source and a point on said first electrical circuit between said first switching means and said inductor and poled to permit current flow only from said last named second terminal to said point on said electrical circuit; and (G) and switch control means having first and second control modes, said switch control means being operative in said first control mode to actuate said first and said second switching means whereby said electromechanical means is permitted to assume a motoring state, said switch control means being operative in said second control mode to actuate said first and said second switching means whereby said electromechanical means is permitted by said first and second unidirectional conducting circuits to assume a generating state.

2. A direct current bilateral energy transfer system comprising:

(A) a source of direct current having first and second terminals;

(B) electromechanical means comprising a motor including first and second electrical terminals and an armature element, and means for interchanging energy between said electrical terminals and armature element;

(C) a first electrical circuit interconnecting said first terminal of said source and said first terminal of said electromechanical means and including in series first switching means and an inductor,
 (1) said first switching means comprising means for controllably opening and closing said first electrical circuit;

(D) a second electrical circuit interconnecting said second terminal of said source and said second terminal of said electromechanical means and including in series second switching means,
 (1) said second switching means comprising means for controllably opening and closing said second electrical circuit;

(E) a first unidirectional conducting circuit connected between said first terminal of said source and said second terminal of said electromechanical means and poled to permit current flow only from said last named second terminal to said last named first terminal;

(F) a second unidirectional conducting circuit connected between said second terminal of said source and a point on said first electrical circuit between said first switching means and said inductor and poled to permit current flow only from said last named second terminal to said point on said electrical circuit;

(G) and switch control means having first and second control modes, said switch control means being operative in said first control mode to actuate said first and said second switching means whereby said electromechanical means is permitted to assume a motoring state, said switch control means being operative in said second control mode to actuate said first and said second switching means whereby said electromechanical means is permitted by said first and second unidirectional conducting circuits to assume a generating state.

3. A direct current bilateral energy transfer system comprising:

(A) a source of direct current having first and second terminals;

(B) electromechanical means comprising a motor including first and second electrical terminals and an armature element and means for interchanging energy between said electrical terminals and armature element;

(C) a first electrical circuit interconnecting said first terminal of said source and said first terminal of said electromechanical means and including in series first switching means and an inductor,
 (1) said first switching means comprising means for controllably opening and closing said first electrical circuit;

(D) a second electrical circuit interconnecting said second terminal of said source and said second terminal of said electromechanical means and including in series second switching means,
 (1) said second switching means comprising means for controllably opening and closing said second electrical circuit;

(E) a first unidirectional conducting circuit connected between said first terminal of said source and said second terminal of said electromechanical means and poled to permit current flow only from said last named second terminal to said last named first terminal;

(F) a second unidirectional conducting circuit connected between said second terminal of said source and a point on said first electrical circuit between said first switching means and said inductor and poled to permit current flow only from said last named second terminal to said point on said electrical circuit; and (G) and switch control means having first and second control modes, said switch control means being operative in said first control mode to actuate said first and said second switching means whereby said electromechanical means is permitted to assume a motoring state, said switch control means being operative in said second control mode to actuate said first and said second switching means whereby said electromechanical means is permitted by said first and second unidirectional conducting circuits to assume a generating state.

4. A direct current bilateral energy transfer system comprising:

(A) a source of direct current having first and second terminals;

(B) electromechanical means comprising a motor including first and second electrical terminals and an armature element, and means for interchanging energy between said electrical terminals and armature element;

(C) a first electrical circuit interconnecting said first terminal of said source and said first terminal of said electromechanical means and including in series first switching means and an inductor,
 (1) said first switching means comprising means for controllably opening and closing said first electrical circuit;

(D) a second electrical circuit interconnecting said second terminal of said source and said second terminal of said electromechanical means and including in series second switching means,
 (1) said second switching means comprising means for controllably opening and closing said second electrical circuit;

(E) a first unidirectional conducting circuit connected between said first terminal of said source and said second terminal of said electromechanical means and poled to permit current flow only from said last named second terminal to said last named first terminal;
(F) a second unidirectional conducting circuit connected between said second terminal of said source and a point on said first electrical circuit between said first switching means and said inductor and poled to permit current flow only from said last named second terminal to said point on said electrical circuit;
(G) switch control means having first and second control modes, said switch control means being operative in said first control mode to actuate said first and said second switching means whereby said electromechanical means is permitted to assume a motoring state, said switch control means being operative in said second control mode to actuate said first and said second switching means whereby said electromechanical means is permitted by said first and second unidirectional conducting circuits to assume a generating state;
(H) and means for selectively actuating said switch control means between its two control modes.

5. A direct current bilateral energy transfer system comprising:
(A) a source of direct current having first and second terminals;
(B) electromechanical means comprising a motor including first and second electrical terminals and an armature element and means for interchanging energy between said electrical terminals and armature element;
(C) a first electrical circuit interconnecting said first terminal of said source and said first terminal of said electromechanical means and including in series and in order first switching means and an inductor,
  (1) said first switching means comprising means for controllably opening and closing said first electrical circuit;
(D) a second electrical circuit interconnecting said second terminal of said source and said second terminal of said electromechanical means and including in series second switching means,
  (1) said second switching means comprising means for controllably opening and closing said second electrical circuit;
(E) a first unidirectional conducting circuit connected between said first terminal of said source and said second terminal of said electromechanical means and poled to permit current flow only from said last named second terminal to said last named first terminal;
(F) a second unidirectional conducting circuit connected between said second terminal of said source and a point on said first electrical circuit between said first switching means and said inductor and poled to permit current flow only from said last named second terminal to said point on said electrical circuit;
(G) current stabilization means responsive to current flowing through said motor for varying the relative periods of open and closed conditions of said switching means for maintaining a constant current flow despite variations in motor operating parameters tending to cause a change in level of current flow.
(H) switch control means having first and second control modes, said switch control means being operative in said first control mode to actuate said first and said second switching means whereby said electromecahnical means is permitted to assume a motoring state, said switch control means being operative in said second control mode to actuate said first and said second switching means whereby said electromechanical means is permitted by said first and second switching means whereby said electromechanical means is permitted by said first and second unidirectional conducting circuits to assume a generating state;
(I) and means for selectively actuating said switch control means between its two control modes.

6. A direct current bilateral energy transfer system comprising:
(A) a source of direct current having first and second terminals;
(B) electromechanical means comprising a motor including first and second electrical terminals and an armature element and means for interchanging energy between said electrical terminals and armature element;
(C) a first electrical circuit interconnecting said first terminal of said source and said first terminal of said electromechanical means and including in series and in order first switching means and an inductor,
  (1) said first switching means comprising means for controllably opening and closing said first electrical circuit;
(D) a second electrical circuit interconnecting said second terminal of said source and said second terminal of said electromechanical means and including in series second switching means,
  (1) said second switching means comprising means for controllably opening and closing said second electrical circuit;
(E) a first unidirectional conducting circuit connected between said first terminal of said source and said second terminal of said electromechanical means and poled to permit current flow only from said last named second terminal to said last named first terminal;
(F) a second unidirectional conducting circuit connected between said second terminal of said source and a point on said first electrical circuit between said first switching means and said inductor and poled to permit current flow only from said last named second terminal to said point on said electrical circuit;
(G) current stabilization means responsive to current flowing through said motor and providing an input to said switching control means for varying the relative periods of open and closed conditions of said switching means for maintaining a constant current flow despite variations in motor operating parameters tending to cause a change in level of current flow;
(H) current transfer control means for providing an input signal to said switching control means for selectively varying the ratio of open to closed periods of operation of said switching means;
(I) switch control means having first and second control modes, said switch control means being operative in said first control mode to actuate said first and said second switching means whereby said electromechanical means is permitted to assume a motoring state, said switch control means being operative in said second control mode to actuate said first and said second switching means whereby said electromechanical means is permitted by said first and second unidirectional conducting circuits to assume a generating state;
(J) means for selectively actuating said switch control means between its two control modes;
(K) and said means for selectively actuating said switch control means including an electronic computation means for shifting said electromechanical means from a motoring to a regenerative condition when said switch control means is placed in said second control mode whereby the braking energy of said electromechanical means is utilized to recharge said source.

7. A direct current bilateral energy transfer system comprising:
(A) a source of direct current having first and second terminals;
(B) electromechanical means comprising a motor including first and second electrical terminals and a permanent magnetic armature element and means for interchanging energy between said electrical terminals and armature element;
(C) a first electrical circuit interconnecting said first terminal of said source and said first terminal of said electromechanical means and including in series and in order first switching means and an inductor,
 (1) said first switching means comprising means for controllably opening and closing said first electrical circuit;
(D) a second electrical circuit interconnecting said second terminal of said source and said second terminal of said electromechanical means and including in series second switching means,
 (1) said second switching means comprising means for controllably opening and closing said second electrical circuit;
(E) a first unidirectional conducting circuit connected between said first terminal of said source and said second terminal of said electromechanical means and poled to permit current flow only from said last named second terminal to said last named first terminal;
(F) a second unidirectional conducting circuit connected between said second terminal of said source and a point on said first electrical circuit between said first switching means and said inductor and poled to permit current flow only from said last named second terminal to said point on said electrical circuit;
(G) current stabilization means responsive to current flowing through said motor and providing an input to said switching control means for varying the relative periods of open and closed conditions of said switching means for maintaining a constant current flow despite variations in motor operating parameters tending to cause a change in level of current flow;
(H) current transfer control means for providing an input signal to said switching control means for selectively varying the ratio of open to closed periods of operation of said switching means;
(I) switch control means having first and second control modes, said switch control means being operative in said first control mode to actuate said first and said second switching means whereby said electromechanical means is permitted to assume a motoring state, said switch control means being operative in said second control mode to actuate said first and said second switching means whereby said electromechanical means is permitted by said first and second unidirectional conducting circuits to assume a generating state;
(J) means for selectively actuating said switch control means between its two control modes;
(K) and said means for selectively actuating said switch control means including an electronic computation means for shifting said electromechanical means from a motoring to a regenerative condition when said switch control means is placed in said second control mode whereby the braking energy of said electromechanical means is utilized to recharge said source.

8. A direct current bilateral energy transfer system comprising:
(A) a source of direct current having first and second terminals;
(B) electromechanical means comprising first and second electrical terminals and a mechanically moving element, including a momentum wheel and means for interchanging energy between said electrical terminals and moving element;
(C) a first electrical circuit interconnecting said first terminal of said source and said first terminal of said electromechanical means and including in series and in order first switching means and an inductor,
 (1) said first means comprising means for controllably opening and closing said first electrical circuit;
(D) a second electrical circuit interconnecting said second terminal of said source and said second terminal of said electromechanical means and including in series second switching means,
 (1) said second switching means comprising means for controllably opening and closing said second electrical circuit;
(E) a first unidirectional conducting circuit connected between said first terminal of said source and second terminal of said electromechanical means and poled to permit current flow only from said last named second terminal to said last named first terminal;
(F) a second unidirectional conducting circuit connected between said second terminal of said source and a point on said first electrical circuit between said first switching means and said inductor and poled to permit current flow only from said last named second terminal to said point on said electrical circuit;
(G) and switch control means having first and second control modes, said switch control means being operative in said first control mode to actuate said first and said second switching means whereby said electromechanical means is permitted to assume a motoring state, said switch control means being operative in said second control mode to actuate said first and said second switching means whereby said electromechanical means is permitted by said first and second unidirectional conducting circuits to assume a generating state.

9. A direct current bilateral energy transfer system comprising:
(A) a source of direct current having first and second terminals;
(B) electromechanical means comprising first and second electrical terminals and a mechanically moving element and means for interchanging energy between said electrical terminals and moving element;
(C) a first electrical circuit interconnecting said first terminal of said source and said first terminal of said electromechanical means and including in series and in order first switching means and an inductor,
 (1) said first switching means comprising means for controllably opening and closing said first electrical circuit;
(D) a second electrical circuit interconnecting said second terminal of said source and said second terminal of said electromechanical means and including in series second switching means,
 (1) said second switching means comprising means for controllably opening and closing said second electrical circuit;
(E) a first unidirectional conducting circuit connected between said first terminal of said source and said second terminal of said electromechanical means and poled to permit current flow only from said last named second terminal to said last named first terminal;
(F) a second unidirectional conducting circuit connected between said second terminal of said source and a point on said first electrical circuit between said first switching means and said inductor and poled to permit current flow only from said last named second terminal to said point on said electrical circuit;
(G) and switch control means having first and second control modes, said switch control means being operative in said first control mode to actuate said first and said second switching means whereby said electromechanical means is permitted to assume a motoring state, said switch control means being operative in said second control mode to actuate said first and said second switching means whereby said electromechanical means is permitted by said first and second unidirectional conducting circuits to assume a generating state.

10. A regenerative braking system for an electro-mechanical transducer, said system comprising: a rechargeable source of electrical energy, energy storage device, control means having first and second control modes, said control means being operative in said first control mode to interconnect said source of energy with said transducer and said energy storage device whereby said transducer is operated in a motoring condition and energy is stored in said energy storage device, said control means being operative in said second control mode to interconnect said source with said transducer and said energy storage device whereby said transducer is operated in a generating condition and together with said energy storage device recharges said source of electrical energy, and means for selectively actuating said control means between its two control modes.

11. A regenerative braking system as defined in claim 10 wherein said control means includes a plurality of electronic switches interconnected between said source of energy and said electromechanical transducer.

12. A regenerative braking system as defined in claim 11 wherein said means for selectively actuating said control means includes electronic commutation means for shifting said transducer from a motoring to a regenerative braking condition when said switch control means is placed in said second control mode.

13. In an attitude control system for space vehicles wherein the attitude of the vehicle is controlled by the reaction of the vehicle to the acceleration or deceleration of a momentum wheel driven by an electromechanical transducer, a regenerative braking system for said transducer comprising: a rechargeable battery; an inductor; a plurality of switches operable when activated to interconnect said battery and said transducer through said inductor; a plurality of unidirectional conducting devices interconnecting said battery with said transducer and said inductor; and, control means for activating said switches in two modes whereby in a first mode said transducer is interconnected to said battery through said switches for motoring operation and in a second mode said transducer is interconnected to said battery through said unidirectional conducting devices for regenerative operation.

14. An attitude control system as defined in claim 13 wherein said switches are electronic switches having first and second terminals and a control electrode for regulating the current therebetween.

15. An attitude control system as defined in claim 14 wherein said control means includes a magnetic amplifier and means for interconnecting said amplifier and said control electrode whereby the current between said first and second terminals is regulated by said amplifier.

References Cited by the Examiner

UNITED STATES PATENTS 2,980,839   4/1961   Haeussermann _____ 318—138
3,165,685   1/1965   Manteuffel et al. ____ 318—138

ORIS L. RADER, *Primary Examiner.*

S. GORDON, J. C. BERENZWEIG,
                          *Assistant Examiners.*